UNITED STATES PATENT OFFICE

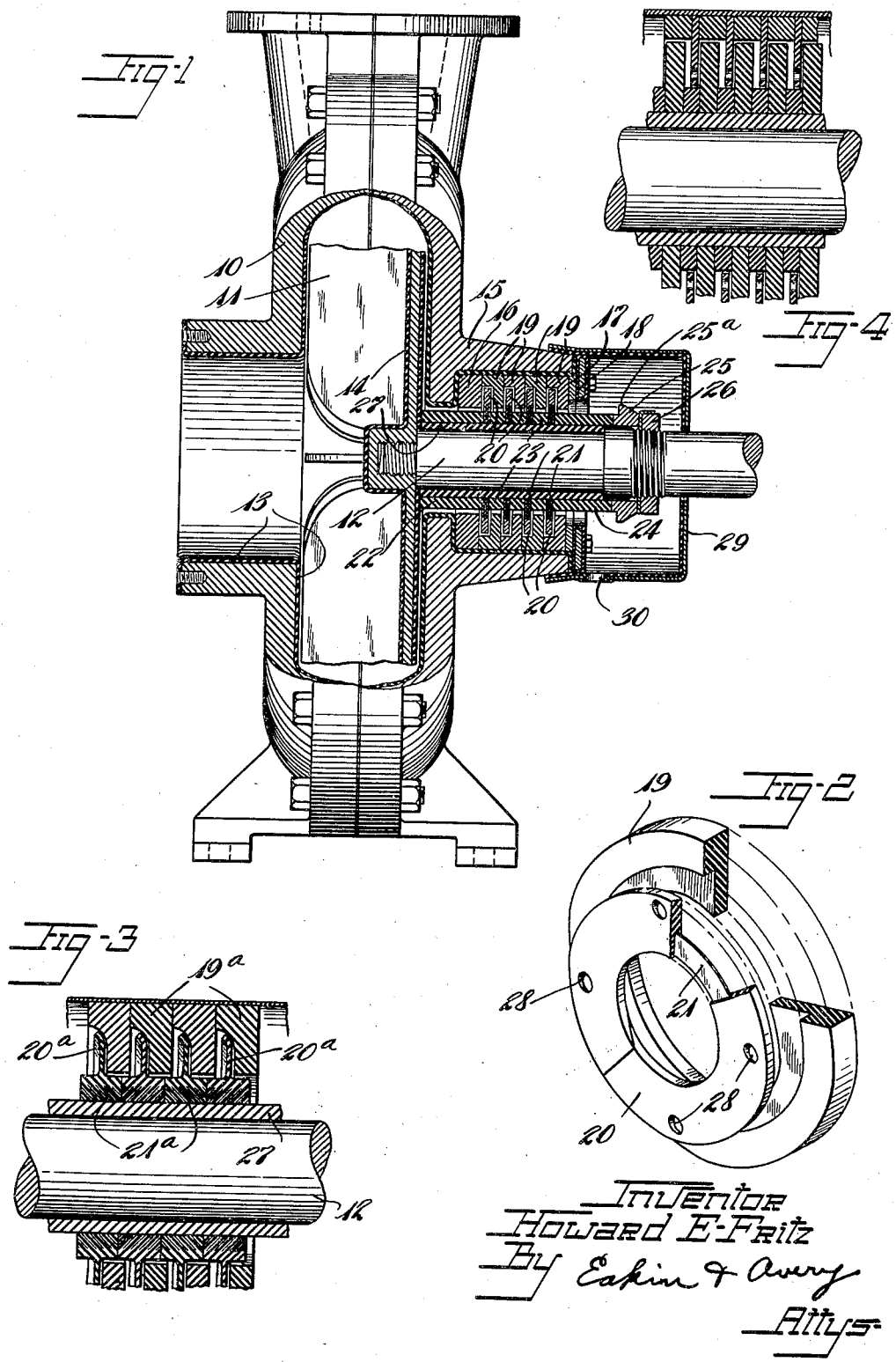

1,925,898

FLUID SEAL FOR RELATIVELY ROTATING PARTS

Howard E. Fritz, Akron, Ohio, assignor to The B. F. Goodrich Company, New York, N. Y., a corporation of New York Application July 23, 1931. Serial No. 552,666

4 Claims. (Cl. 286—10)

This invention relates to fluid seals for relatively rotating parts such as the shaft and casing of a centrifugal pump and its chief objects are to provide an effective seal without excessive wear; to provide a seal in which the parts relatively moving in contact with each other are adapted to be effectively lubricated by a fluid such as the water or other liquid being pumped; to provide a structure adapted for economy of manufacture and assembly; to provide a structure adapted to be readily and economically repaired; and to provide a structure adapted to resist the damaging action of corrosive fluids or of abrasive material contained in the fluid.

Of the accompanying drawing:

Fig. 1 is a side elevation, with parts sectioned and broken away, of a centrifugal pump embodying my invention in its preferred form.

Fig. 2 is a perspective view, with parts cut away, of a pair of rings constituting parts of the sealing device.

Fig. 3 is a longitudinal section of a sealing structure embodying my invention in a modified form.

Fig. 4 is a longitudinal section of another modification.

Referring to the drawing, 10 is the casing, 11 the impeller and 12 the shaft of a centrifugal pump. The casing may be provided with a rubber lining 13 and the impeller with a rubber coating 14 for resistance to the abrasive action of sand or grit or for resistance to the chemical action of corrosive fluids.

The casing 10 is formed with a stuffing box 15 for the shaft 12 and, clamped therein between spacer ring 16 and 17, preferably of hard rubber, by means of a rubber-covered cap ring 18, are several labyrinth sealing rings 19, 19, which are preferably of hard rubber.

Mounted upon the shaft 12 in alternate relation to the labyrinth rings 19 are several sealing rings 20, 20, each preferably formed of soft or resilient rubber provide a flexible sealing flange and each having a metal reinforcing ring 21 in its base, the rings 20 being suitably spaced by spacer rings 22, 23, 23, 24, which are preferably of hard rubber, and are held in clamping relation to the sealing rings 20 by the hub of the impeller 11 and by a washer 25 and nut 26 upon the shaft 12, the washer being formed with a drip-flange 25ª. A corrosion-resisting sleeve 27 of hard rubber or ceramic or other suitable material may be mounted upon the shaft within the spacer rings 22, 23, 24 and interposed between the hub of the impeller and a shoulder formed on the shaft and may seal against the rubber covering of the impeller to protect the shaft from corrosive fluid.

Preferably each of the rings 20 is formed with one or more small apertures such as the apertures 28, 28 (Fig. 2), in the rubber portion thereof extending outward beyond the metal reinforcing ring 21, to allow a small flow of fluid through the rings for the purpose of lubrication, and a rubber-lined housing 29 is mounted upon the casing 10 and surrounds the shaft 12 and is provided with a drain-aperture 30 at its bottom for catching and conducting away the lubricating fluid as the latter flows out of the sealing device, the drip-flange 25ª of the washer 25 intercepting the fluid and preventing it from reaching the exposed metal portion of the shaft.

In the operation of the device with moderate fluid pressure in the pump the hard-rubber rings 19 and soft rubber rings 20, with permissibly small clearance between them, provide a corrosion-resisting labyrinth seal. When the pump is operated at a speed such as to produce a higher fluid pressure, the pressure causes the soft rubber rings 20 to flex laterally into contact with the respective hard-rubber rings 19 and more positively seal against them, and the apertures 28, in allowing a small flow of the fluid through the rings 20, not only provide for lubrication of the sliding contact of the rings 19, 20, but also cause the fluid pressure to be sustained by a plurality of the rings 20 and thus excessive pressure of the rings 20 against the rings 19 is avoided, the force of the fluid pressure being distributed among them. The sealing pressure varies in accordance with the pressure of the restrained fluid and the sealing elements are held in face to face contact by direct pressure without wedging, binding or cramping.

In the modification shown in Fig. 3, the soft-rubber rings 20ª, 20ª, are formed integral with hard rubber bases 21ª and are of dished form at their outer margins so that they will be caused to be stretched and flexed by centrifugal force into contact with the hard-rubber rings, 19ª, 19ª, which are complementally formed.

In the modification shown in Fig. 4, the soft-rubber rings, 20ᵇ, are mounted upon the stationary member, which is desirable in the case of high speed shafts, to avoid excessive deformation of them by centrifugal force.

Other modifications are possible within the scope of the appended claims.

I claim:

1. In combination with a pair of relatively rotating members a fluid seal therefor comprising sealing means on one of the members formed with an annular sealing surface, and an annular flange on the other of said members having an annular flexible portion adapted to be so flexed laterally by the pressure of the fluid that an annular zone of one of the side faces of said flexible portion is brought into sealing contact with the said annular sealing surface, one of the annular coacting surfaces being dished and the other being substantially complemental thereto.

2. A combination as defined in claim 1 in which the flange is on a rotating member and its flexible portion is so dished as to be held under sealing pressure against its mate by centrifugal force.

3. In combination with a pair of relatively rotating members a fluid seal therefor comprising sealing means on one of the members formed with an annular sealing surface, and a flexible annular flange of rubber on the other of said members adapted to be so flexed laterally by the pressure of the restrained fluid that an annular zone of one of its said faces is brought into sealing contact with the said annular sealing surface, one of said sealing elements being formed with a passage for restricted flow of the fluid from the main body of the fluid to the two annular sealing surface for lubrication thereof.

4. In combination with a pair of relatively rotating members a fluid seal therefor comprising a plurality of pairs of sealing means, one of each pair being upon each of the said members, and one of the sealing means of each pair comprising a flexible annular flange of rubber adapted to be held against its mate in sealing relation thereto by the force of the restrained fluid, at least one of the sealing elements being formed with a passage for such restrained flow of the fluid past the sealing element and to the next pair that the force of the restrained fluid is sustained in part by each of a plurality of the pairs of sealing elements.

HOWARD E. FRITZ.